Patented Jan. 30, 1940

2,188,538

UNITED STATES PATENT OFFICE 2,188,538

VAT DYESTUFFS OF THE BENZANTHRONE-ANTHRAQUINONE-ACRIDINE SERIES

Donald P. Graham, Wilmington, Del., assignor to E. I. du Pont de Nemours & Company, Wilmington, Del., a corporation of Delaware No Drawing. Application December 16, 1938, Serial No. 246,176

4 Claims. (Cl. 260—274)

This invention relates to the preparation of new dyestuffs of the benzanthrone-anthraquinone-acridine series, and has for its object the preparation of new dyestuffs of this series which dye in desirable olive shades of excellent fastness properties.

In U. S. Patent 995,936, the preparation of what are termed as green dyestuffs is described in which the condensation product of Bz-1-bromo-benzanthrone with 1-aminoanthraquinone is fused in alcoholic potash. Because of the desirable dyeing and fastness properties of this class of dyestuffs, many modifications and substitutions have been made in this molecule to obtain dyes of the same general series which dye in other shades.

I have found that by condensing 1 mole of 6-Bz-1-dibromo-benzanthrone with 1 mole of alpha-aminoanthraquinone, and then condensing 2 moles of the resulting benzanthrone-aminoanthraquinone with 1 mole of 1:4- or 1:5- or 1:8-diaminoanthraquinone, and then subjecting the resulting product to alkaline fusion, new dyestuffs are obtained which dye cotton in new olive shades of excellent fastness properties. The resulting dyestuffs are believed to have the following general formula:

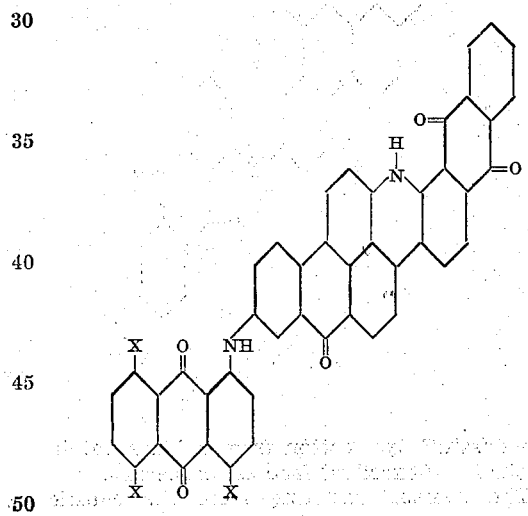

in which one X represents the following radical:

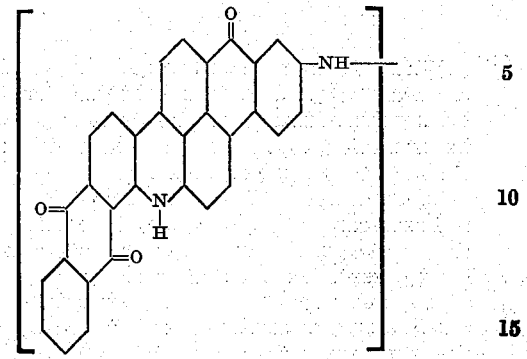

and the remaining X's represent hydrogen. Although it can not be definitely proved whether the center anthrimide groups are ring-closed or not ring-closed in the alkali fushion, for the purpose of this description it is believed that the above formula is sufficiently accurate to be used in identifying applicant's new and valuable dyestuffs, and it is to be understood that in the claims the formulae are used to identify the dyestuffs that are actually produced by the process of the examples.

These dyes may be converted to the leuco sulfuric acid esters by the usual methods.

The following examples are given to illustrate the invention. The parts used are by weight.

Example 1

80 parts of 6-Bz-1-dibromo-benzanthrone, 46 parts of 1-aminoanthraquinone, 50 parts of soda ash, 5 parts of copper acetate, and 0.5 part of copper powder are slurried in 1000 parts of nitrobenzene, heated to 200–210° C. for 3 to 4 hours and cooled to 150–170° C. 24 parts of 1:5-diaminoanthraquinone are added at this point and the charge heated again to 200–210° C. It is stirred at this temperature for several hours to allow the condensation to go to completion and is then cooled to 80° C. and filtered. The cake is washed with a small quantity of nitrobenzene to remove the mother liquor and is then subjected to steam distillation until free of solvent, filtered off, washed with water and dried. The yield is essentially quantitative.

An alcoholic potassium hydroxide melt is prepared using 1150 parts of ethyl alcohol and 1150 parts of potassium hydroxide. This melt is heated to 130° C. to effect complete fluidity and then cooled to 120° C. At this temperature, 115 parts of the pentanthrimide (prepared as described in the preceding paragraph) are added. The charge is heated slowly to 150° C. (allowing some alcohol to distill off) and is held at 145–155° C. for 3 to 4 hours. The charge is then drowned in 6000 parts of water and oxidized by aeration (or by addition of an oxidizing agent) until the color has been completely precipitated. The crude color is filtered off, washed alkali free, and dried. The yield of crude product is approximately quantitative. 100 parts of this material are slurried in 2000 parts of 96% sulfuric acid at 5° C. ± 2° C. for from 2 to 5 hours. It is then drowned in a large volume of cold water, filtered, and washed acid free. The cake is then adjusted to the desired concentration and standardized and appears as a dark olive colored paste. The product dissolves in concentrated sulfuric acid with a green color and gives a black vat from which cotton is dyed in olive shades of excellent fastness.

*Example 2*

When 1:8-diaminoanthraquinone or 1:4-diaminoanthraquinone is substituted for 1:5-diaminoanthraquinone in the preceding example, an isomeric product is obtained which is very similar in dyeing properties.

Condensation of the bromo-benzanthrone with the aminoanthraquinones may be carried out by the usual Ullmann condensation reactions in an inert organic solvent and in the presence of an acid binding agent and a copper catalyst. The alkaline ring-closure may be effected by any of the usual methods employed in the preparation of benzanthrone-anthraquinone-acridines.

I claim:

1. The dyestuffs resulting from the caustic alkali condensation of the products of the following general formula:

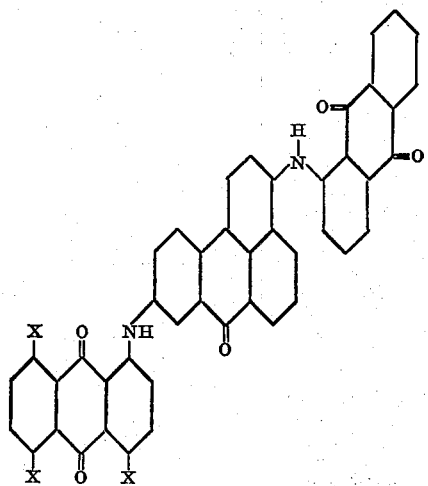

in which one X represents the following radical:

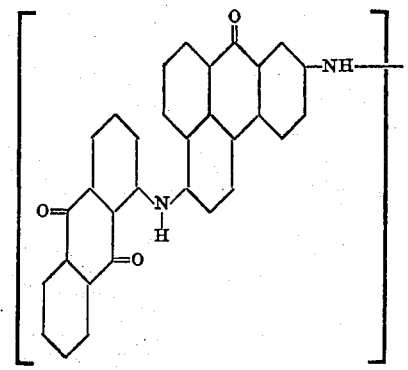

and the remaining X's represent hydrogen, which dyestuffs dye cotton from a black vat in olive shades of excellent fastness properties.

2. The dyestuff resulting from the caustic alkali condensation of the product of the general formula:

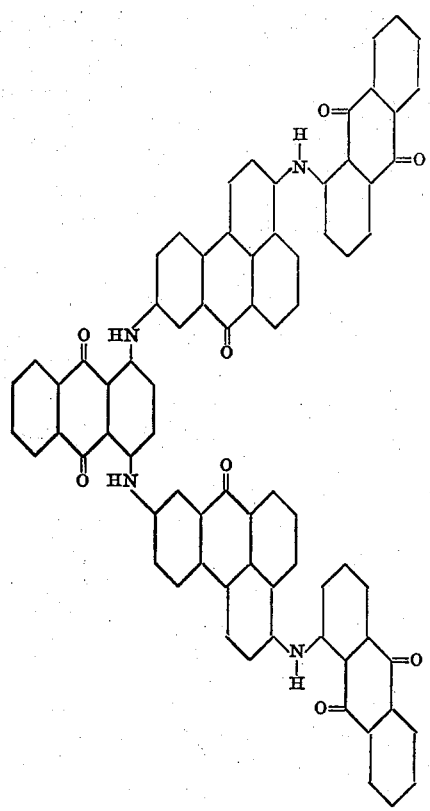

which dyestuff dyes cotton from a black vat in olive shades of excellent fastness properties.

3. The dyestuff resulting from the caustic alkali condensation of the product of the general formula:

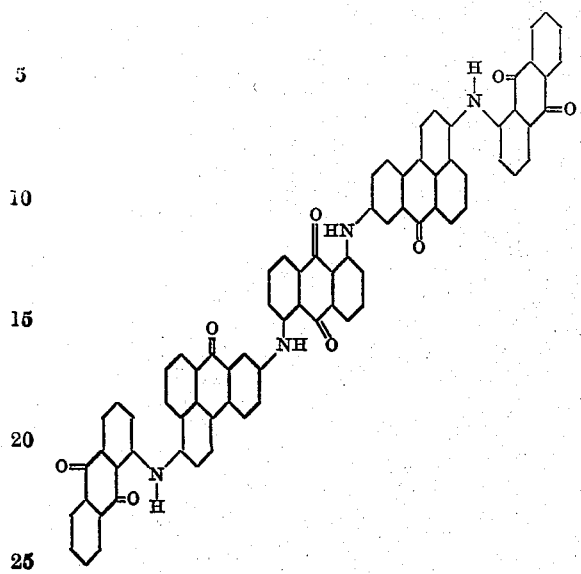

which dyestuff dyes cotton from a black vat in olive shades of excellent fastness properties.

4. The dyestuff resulting from the caustic alkali condensation of the product of the general formula:

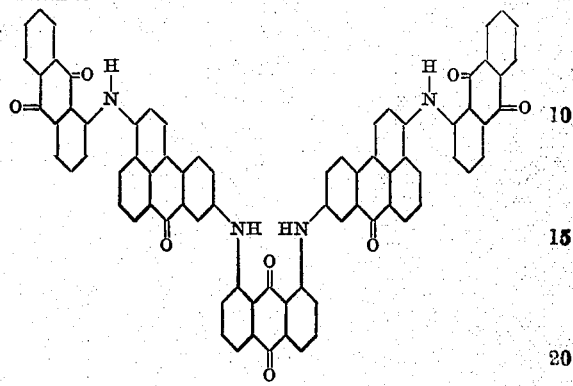

which dyestuff dyes cotton from a black vat in olive shades of excellent fastness properties.

DONALD P. GRAHAM.